L. A. YOUNG.
SEAT BACK SPRING.
APPLICATION FILED MAR. 15, 1915.
1,218,234.
Patented Mar. 6, 1917.
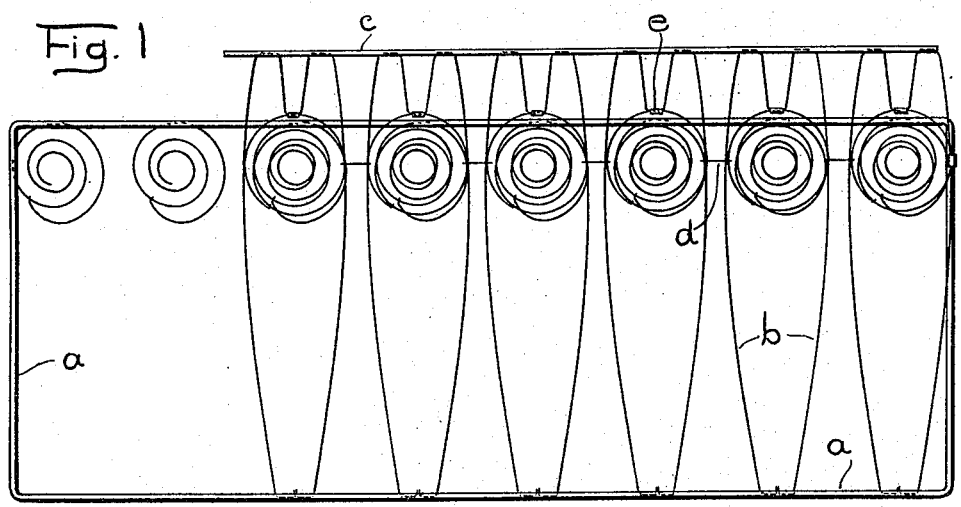
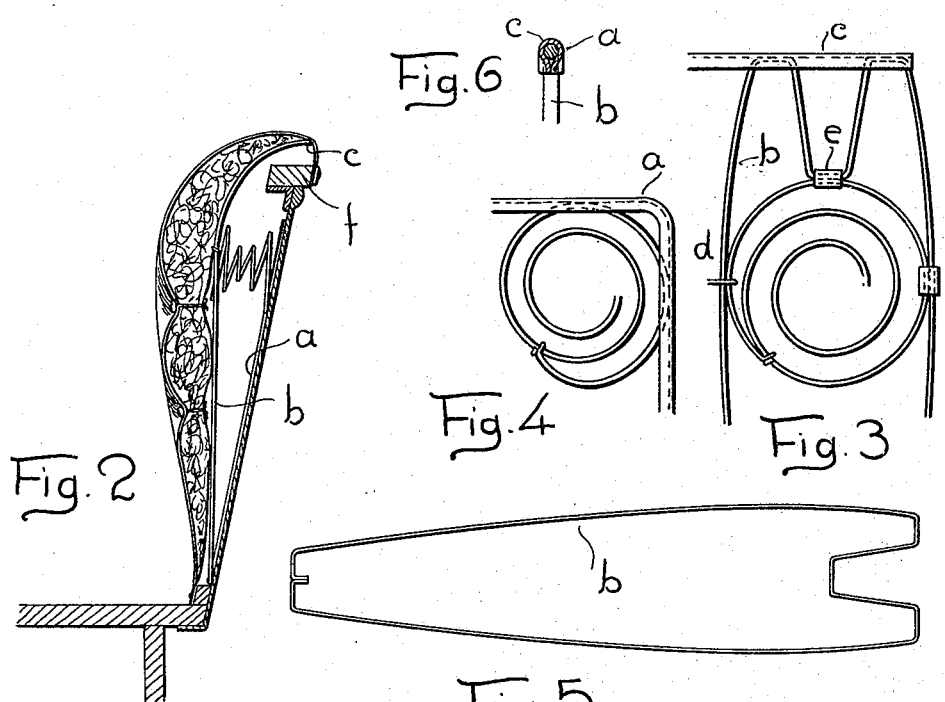
WITNESSES
INVENTOR
Leonard A. Young
BY
Ralzemond A. Parker
ATTORNEY

UNITED STATES PATENT OFFICE.

LEONARD A. YOUNG, OF HIGHLAND PARK, MICHIGAN.

SEAT-BACK SPRING.

1,218,234. Specification of Letters Patent. Patented Mar. 6, 1917.

Application filed March 15, 1915. Serial No. 14,475.

*To all whom it may concern:*

Be it known that I, LEONARD A. YOUNG, a citizen of the United States, residing at Highland Park, county of Wayne, State of Michigan, have invented a certain new and useful Improvement in Seat-Back Springs, and declare the following to be a full, clear, and exact description of the same, such as will enable others skilled in the art to which it pertains to make and use the same, reference being had to the accompanying drawings, which form a part of this specification.

This invention relates to seat back springs and has for its object a seat back spring adapted to efficiently and yieldingly support the upholstering at the top of the seat back and to eliminate the necessity of the upholstering roll. Seat back springs to accomplish these results are not broadly new, but the seat back spring hereinafter to be described can be built and sold very much cheaper than the seat back springs heretofore brought out to accomplish these results. It is, therefore, adapted to enter a field that these more expensive structures cannot reach, namely, the cheaper automobiles which have never adopted seat back springs with the upper built out edge on account of their cost.

The simplicity in construction and the ease with which my seat back spring may be installed will more fully appear in the detailed description following.

In the drawings,—

Figure 1 is a front elevation of the seat back spring showing a part of the front broken away for clearness of illustration.

Fig. 2 is a section through a seat back showing my seat back spring installed and covered with the upholstering.

Fig. 3 is an enlarged detail of the upper front corner of the seat back spring.

Fig. 4 is an enlarged detail of the rear upper corner of my seat back spring.

Fig. 5 is an enlargement of one of the spring loops, a plurality of which forms the supporting face of the seat back spring.

Fig. 6 is a detail showing how the channel bar which forms the border of the seat back spring is crimped over the loops.

A steel or metal frame $a$ is used as a base. This frame may be made up of one or more channel bars, and preferably only one row of helical or hour-glass type springs is used. This row is held in place by crimping the upper channel bar $a$ over the bottom coil of each spring. With the exception of the two end springs, the remaining springs are secured to the frame $a$, each at only one point. Further fastening is not required for when the spring is in place as shown in Fig. 2, the seat back holds it in proper position. It is evident that so far the spring is very cheap to build.

Now all that is added to form the supporting face of the seat back spring is a plurality of loops $b$, a single channel bar $c$, a plurality of tying links $d$, and a plurality of clips $e$. Each loop $b$ is made of a single wire bent to a somewhat elongated and crude heart shape. The meeting ends of this single wire are held by crimping the bottom portion of the channel bar of the frame $a$ over the two ends. The tops of the two lobe portions are secured to the channel bar $c$ by crimping, while the meeting sides of the two lobes extend downward to the top coil of the adjacent helical spring to which they are tied by the clip $e$.

The tying links $d$ are merely short lengths of wire that are bent over the wire of the loop $b$ at the point where it passes the helical spring, and also over the top of the helical spring. Each end of each tying link is bent over one loop portion $b$ and one top coil of the helical spring. Consequently these simple tying links $d$ not only connect the helical springs together at the top but also connect the elongated loops $b$ together.

Referring to Fig. 2, it will be seen that the top of the loop is bent to form what might be termed an incomplete arch or cantaliver spring as it has only one point of fastening to resist stresses put upon it. Before the spring is put into the seat back and drawn down by the upholstering, the arch has not quite as small a radius as the arch shown in Fig. 2, but after the upholstering has been drawn down and tacked to the trimming rail, the incomplete arch has a smaller radius as it is bent by reason of the stress brought upon it by the tension on the upholstering cover. The exact position of the arch relative to the trimming rail will depend a good deal upon the relative sizes of the seat back and the seat back spring, and also upon how tightly the upholstering is drawn over it.

These incomplete arches together with the channel bar $c$ which ties them together in a simple way at their tops, form what, for the purpose of reference, I shall call a free overhanging edge spring structure, that is to say, this edge spring structure is adapted to overhang the trimming rail $f$ and is free of any means of tying it to the trimming rail other than the tightly drawn upholstering itself. It, therefore, is perfectly free to move toward or away from the trimming rail within given limits, and therefore acts upon the cantaliver spring principle and forms a very soft and yielding top for the trimming rail, in fact, a softer and more comfortable top upholstering than has been the case with most of the springs heretofore designed to accomplish similar results.

Above all, the cheapness of this form of construction is to be considered and also its efficiency to accomplish the purpose of such edge spring structures. It is to be noted that the lobe-like bends of the tops of the loops $b$ which connect with the helical springs not only serve to tie the helical springs more securely to the loops $b$ but also serve to substantially double the upholstering supporting surface of the seat back spring above the helical springs. It is above the helical springs that the upholstering is more liable to sag between the loops and interfere with the action of the helical springs than any other point on the seat back spring. Numerous ways have heretofore been designed of obviating this difficulty but I believe that my way is both new and one of the simplest.

What I claim is:

1. In a seat back spring, the combination of a base frame, a plurality of helical springs secured thereto, and a plurality of elongated heart-shaped loops secured to the bottom bar of the base frame extending upwardly over the helical springs and the lobe portions of each loop forming incomplete arches resulting in a free overhang above or adjacent the trimming rail when the seat back spring is installed in the seat back.

2. In a seat back spring, the combination of a base frame, helical springs secured thereto, and a plurality of elongated heart-shaped loops secured to the lower bar of the base frame extending upwardly over the helical springs and the lobe portions of the loops forming incomplete arches that result in a free overhang above or adjacent the trimming rail when the seat back spring is installed in a seat back, and the meeting sides of the lobe portions extending to and secured to the helical springs.

3. In a seat back spring, the combination of a base frame, helical springs secured thereto, a plurality of elongated heart-shaped loops secured to the bottom bar of the base frame extending upwardly over the helical springs and forming incomplete arches beyond the helical springs, the meeting sides of the lobe portions extending back to the helical springs to which they are secured, and a bar for securing together the tops of the lobe portions.

4. In a seat back spring, the combination of a base frame, helical springs supported thereby, and a plurality of spring elements secured to the bottom of said base frame, extending up over the helical springs and beyond the same to form incomplete spring arches which extend both materially beyond the helical springs and beyond the top of the base frame, and which are supported only by the said helical springs.

5. In a seat back spring, the combination of a base frame, a plurality of helical springs secured thereto, and incomplete spring arches extending from the outer coils of the helical springs upwardly and beyond the top of the base frame and which are supported only by the said helical springs.

6. In a seat back spring, the combination of a base frame, helical springs secured thereto, and a plurality of incomplete wire arches extending materially beyond the helical springs upwardly and beyond the top of the base frame but which are supported only by the helical springs.

7. In a seat back spring, the combination of a base frame, a plurality of helical springs secured thereto, and a plurality of spring wires secured to the lower member of the base frame, extending up over the helical springs to form a supporting surface and materially beyond the said helical springs and the top of the base frame to form incomplete arches which are supported only by the helical springs.

8. In a seat back spring, the combination of a channel bar frame, helical springs crimped into the channel bar frame, a plurality of spring wires crimped into the bottom channel bar of the frame, passing upwardly over the helical springs to form a supporting surface and materially beyond the helical springs and the top of the channel bar frame to form incomplete spring arches which are supported only by the helical springs, and a channel bar crimped into the free end of the incomplete arches for connecting them together.

9. In a seat back spring, the combination of a base frame, helical springs supported thereby, a plurality of spring wires extending from the helical springs upwardly therefrom to form incomplete arches above the top of the base frame, the said arches being supported solely by the said helical springs, and a stiff member connecting the free ends of said arches to hold them together.

10. In a seat back spring, the combination of a base frame, a single row of helical springs supported along the top of the base frame and a plurality of spring wires secured to the bottom of the base frame, extending upwardly over the single row of helical springs to form a supporting surface and materially beyond the helical springs and beyond the top of the base frame to form incomplete arches which are supported solely by the said helical springs, and a stiff member for connecting together the ends of the said arches.

11. In a seat back spring, the combination of a base frame constructed of channel bars, helical springs arranged in a single row crimped into the top channel bar of the base frame, a plurality of spring wires crimped into the lower channel bar of the base frame and extending upwardly from the single row of helical springs to form a supporting surface and then materially beyond the said row of helical springs and beyond the top of the base frame to form incomplete arches supported solely by the helical springs, and a stiff member connecting together the free ends of the arches.

12. In a seat back spring, the combination of a base frame constructed of channel bars, a single row of helical springs crimped into the top channel bar, a plurality of spring wire loops crimped into the bottom channel bar, extending up over the helical springs to form a supporting surface, then materially beyond the helical springs and beyond the top of the base frame, thence returning back over the helical springs and to the bottom channel bar into which the end of the returned portion is crimped, the said spring wire loops forming beyond the helical springs incomplete arches supported solely by the said helical springs, and a channel bar connecting together the top ends of the loops or incomplete arches.

13. In a seat back spring, the combination of helical springs and wire units passing up over the tops of the springs and each comprising a single piece of wire bent to an elongated heart shape forming two loops at the top extending beyond the helical springs.

14. In a seat back spring, the combination of helical springs and wire units passing up over the helical springs and each comprising a single piece of wire bent to an elongated heart shape forming two loops at the top extending beyond the helical springs and connected with the adjacent helical spring by the short run of wire which connects the two loops.

In testimony whereof, I sign this specification in the presence of two witnesses.

LEONARD A. YOUNG.

Witnesses:
STUART C. BARNES,
VIRGINIA C. SPRATT.